(12) United States Patent
Orban et al.

(10) Patent No.: US 9,488,214 B2
(45) Date of Patent: Nov. 8, 2016

(54) ARMATURE-BASED SUCTION DEVICE (71) Applicants: John Orban, Torrington, CT (US);
Robert Borghesi, Torrington, CT (US)

(72) Inventors: John Orban, Torrington, CT (US);
Robert Borghesi, Torrington, CT (US)

( * ) Notice: Subject to any disclaimer, the term of this patent is extended or adjusted under 35 U.S.C. 154(b) by 27 days.

(21) Appl. No.: 14/640,291

(22) Filed: Mar. 6, 2015

(65) Prior Publication Data
US 2016/0258471 A1 Sep. 8, 2016

(51) Int. Cl.
A45D 42/14 (2006.01)
F16B 47/00 (2006.01)

(52) U.S. Cl.
CPC .................. F16B 47/00 (2013.01)

(58) Field of Classification Search
CPC ........................................ F16B 1/00
USPC ....... 248/206.2, 206.5, 349.1, 415, 458, 521
See application file for complete search history.

(56) References Cited

U.S. PATENT DOCUMENTS

| | | | |
|---|---|---|---|
| 1,426,930 A | 8/1922 | Waldron | |
| 1,842,383 A * | 1/1932 | Bell | F16B 47/00 248/206.2 |
| 2,123,549 A * | 7/1938 | Williams | B60R 9/058 248/363 |
| 2,278,075 A | 3/1942 | Hecht | |
| 2,557,434 A | 6/1951 | Hoverder | |
| 3,976,274 A | 8/1976 | Langguth | |
| 4,133,575 A * | 1/1979 | Mader | B60J 1/20 248/205.8 |
| 5,411,231 A | 5/1995 | Buck | |
| 5,639,553 A | 6/1997 | Nagai | |
| 5,665,477 A | 9/1997 | Meathrel | |
| 6,143,391 A * | 11/2000 | Barnes | F16B 47/00 248/205.8 |
| 6,154,929 A | 12/2000 | Dwyer | |
| 6,663,077 B2 | 12/2003 | Zou | |
| 6,669,033 B1 * | 12/2003 | Lian | F16B 47/00 211/106 |
| 7,690,609 B2 | 4/2010 | Akai | |
| 7,878,467 B2 | 2/2011 | Chen | |
| 8,079,557 B2 * | 12/2011 | Tu | F16B 47/006 248/206.2 |
| 2003/0161984 A1 | 8/2003 | Bries | |
| 2007/0221801 A1 * | 9/2007 | Jensen | F16B 47/00 248/206.2 |
| 2010/0140437 A1 * | 6/2010 | Orban | F16B 47/00 248/363 |

FOREIGN PATENT DOCUMENTS

EP 125550 11/1984

* cited by examiner

Primary Examiner — Gwendolyn Baxter
(74) Attorney, Agent, or Firm — Michael A. Blake (57) ABSTRACT An armature-based suction device comprising a convex surface on one side of the device when the device is not in use. A concave surface is located on an opposite side of the device when the device is not in use. The concave surface has a matte finish. The concave surface comprises a perimeter located on an outer edge of the concave surface where the perimeter is non-occlusive when the device is sealed onto a native surface. An annular square-shouldered cross-sectional recess located adjacent to the perimeter. The recess has a main flat surface that is at an acute angle to the concave surface, where the recess is non-occlusive when the vacuum seal is sealed onto a native surface. At least one annular band of soft, resilient, sticky, solid, and non-flowable material is located on the annular square-shouldered cross-sectional recess, and where the device is reusable.

14 Claims, 7 Drawing Sheets

ARMATURE-BASED SUCTION DEVICE

TECHNICAL FIELD

The present invention relates generally to a non-suction cup armature-based suction device with a resilient ring of material.

BACKGROUND

There are many types of suction-cup-based devices currently on the market, most of which mount adequately to nonporous, glass smooth surfaces. Few, if any, of these devices will mount effectively to nonporous, textured surfaces made of tile, glass, metal or plastics. They generally rely upon a hard shell, soft cup or disc, gasket, lever and spring, or screw knob to produce suction, all of which fail to perform adequately on textured surfaces. The reasons are threefold:

First, typical suction-cup-based devices fail to properly seal to textured mounting surfaces due to the lack of a proper conforming seal and as a result leak paths form causing atmospheric air to infiltrate and negate the vacuum chamber. This lack of intimate engagement with textured surfaces causes inadequate suction and as a result the typical suction-cup-based device may mount for a relatively short duration or not at all on such surfaces. In addition, typical suction-cup-based devices with applied external or open channel perimeter seals can fail due to rolling or creeping of the seal under lateral loads, i.e., loads which are parallel to the native surface either in a vertical or horizontal plane. A native surface is any surface that a suction device may seal or attach to. Under such lateral loading, without a proper mechanical stop the seal will tend to roll and lose intimate contact with the native surface creating a leak path, and the seal may actually break free from the suction cup itself resulting in loss of vacuum and thus failure of the device to hold fast. Also, without a proper mechanical stop very soft seals can creep and distort to the extent that they can no longer maintain intimate contact with the native surface and will likewise fail.

Second, typical suction-cup-based devices fail to resist lateral slippage (i.e., parallel to the native textured surface) due to a lack of design structures on their interior surfaces that would apply additional mechanical friction. A typical suction-cup-based device's smooth interior surface does not effectively conform to or grip the uneven contours of a textured mounting surface. As a result there is less frictional contact with the native surface with which to resist sliding.

Third, typical suction-cup-based devices do not incorporate an ancillary mechanism with which to apply additional mechanical friction to the superstructure proportional to increases in lateral loading which might mitigate lateral slippage of the device parallel to the native surface. This is a particular problem on textured surfaces due to the lack of grip between the typically smooth interior surface of a suction-cup-based device and the uneven native surface. Vacuum forces that might hold a 5 pound weight on a vertical glass smooth surface are generally insufficient to hold the same weight on a vertical textured surface.

Consumers need a reliable suction device that will hold fast on a variety of nonporous surfaces, smooth and textured alike. There are no known suction-cup-based devices currently on the market that will adequately accomplish this. Therefore a unique suction device that overcomes these challenges is desirable.

Therefore a non-suction cup device that overcomes the above described and other disadvantages is needed.

SUMMARY

The invention is related to an armature-based suction device comprising: a convex surface on one side of the armature-based suction device when the armature-based suction device is not in use; a concave surface located on an opposite side of the armature-based suction device when the armature-based suction device is not in use, the concave surface having a matte finish, the concave surface comprising: a perimeter located on an outer edge of the concave surface where the perimeter is non-occlusive when the armature-based suction device is sealed onto a native surface; an annular recess located adjacent to the perimeter, the annular square-shouldered cross-sectional recess having a main flat surface that is at an acute angle to the concave surface, where the recess is non-occlusive when the vacuum seal is sealed onto a native surface; at least one annular band of soft, resilient, sticky, solid, and non-flowable material located on the annular recess, where the annular band has a tackiness that produces a 90° Peel strength of about 0.1 lb./in. to about 40 lbs./in, and where the annular band has a semi-circular cross-sectional shape, and the flat side of the semi-circular cross-sectional shape abuts the concave surface, and the circular side of the semi-circular cross-sectional shape faces away from the concave surface; and where the armature-based suction device is reusable.

The invention also relates to an armature-based suction device system comprising: a native surface; an armature-based suction device removably sealed onto the native surface; a convex surface on one side of the armature-based suction device when the armature-based suction device is not in use; a concave surface located on an opposite side of the armature-based suction device when the armature-based suction device is not in use, the concave surface having a matte finish, the concave surface comprising: a perimeter located on an outer edge of the concave surface, where the perimeter is non-occlusive; an annular square-shouldered recess located adjacent to the perimeter, the annular recess having a main flat surface that is at an acute angle to the concave surface, where the recess is non-occlusive; at least one annular band of soft, resilient, sticky, solid, and non-flowable material located on the annular recess, where the annular band has a tackiness that produces a 90° Peel strength of about 0.1 lb./in. to about 40 lbs./in, and where the annular band has a semi-circular cross-sectional shape, and the flat side of the semi-circular cross-sectional shape abuts the concave surface, and the circular side of the semi-circular cross-sectional shape faces away from the concave surface when not in use, and the annular band flattens, widens and conforms to the native surface features when in use; where the armature-based suction device is reusable.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Unlike typical suction-cup-based devices that rely upon a hard shell, soft cup or disc, gasket, lever-and-spring or screw knob, the disclosed invention is a unique armature-based suction device that incorporates three distinct design features which provide both superior performance on textured surfaces and enhanced resistance to slippage under lateral loading.

First, the disclosed armature-based suction device has an annular seal composed of a proprietary polymer that produces superior adhesion by more perfectly conforming to native surfaces of varying texture while resisting environmental degradation due to extremes in temperature and humidity. Also, the square-shouldered channel/recess at the armature's perimeter in which the annular seal is applied acts as a mechanical stop; a solid buttress keeping the seal from rolling under the armature as strong lateral loads are applied. When a lateral load is applied to the armature-based suction device the square-shouldered internal channel wall facing the load prevents the seal from rolling in the opposite direction to it. Conversely, the extreme outer lip of the channel opposite the loaded side further contains and prevents the seal from rolling out from under the disclosed armature-based suction device. It should be emphasized that the armature is not a stand-alone suction cup but rather a semi-rigid matrix wherein the applied annular seal provides the sole means of creating and sustaining suction Unlike typical pure suction cups the disclosed armature-based suction device's interior surface has a matte texture for reasons described below. Also unlike typical pure suction cups which have flexible, circumferential "feathered edges" (diminishing thickness relative to distal radius) that provide the conformative primary occlusive vacuum seal with native surfaces and to which extraneous annular seals are sometimes applied to enhance performance, the disclosed armature-based suction device minus its annular seal has a relatively thick, non-feathered, semi-rigid circumferential edge which makes no occlusive seal beyond that provided by static adhesion. When attempting to press the disclosed armature-based suction device minus its annular seal to a native surface its circumferential edge curls upward, lifting away from the native surface, raising its peripheral channel/recess above the native surface thereby exposing and creating multiple leak paths through microscopic capillary-like channels within the matte interior surface of the armature and allowing ambient atmosphere to invade and negate any vacuum held within it. This is in stark contrast to the smooth interior surface and "feathered edge" principle of occlusion upon which typical suction cups mount to native surfaces. In short, without its annular seal the disclosed armature-based suction device cannot adequately create or maintain an even minimal degree of suction and therefore cannot be considered a suction-cup-based device.

The second unique design feature of the disclosed armature-based suction device is its proprietary interior surface consisting of minimally protruding, concentric friction ribs and the aforementioned matte surface texture. The friction ribs significantly increase "bite" upon the native surface which provides superior mechanical resistance to slippage, creep, or migration when lateral forces (i.e., suspended vertical weight or horizontal tension) are applied to the device. Once mounted, suction within the disclosed armature-based suction device compresses the friction ribs against the native surface, acting as an emergency brake of sorts while volumetrically increasing the vacuum chamber by structurally forming additional voids to either side of the ribs. Contact with the armature's remaining matte interior surface (between and outboard of the rib voids) creates additional "bite" or "stiction" on the native surface. In addition, the microscopic, capillary-like channels in the matte surface texture effectively extend the armature's vacuum chamber outward past the ribs in a radial pattern to the annular seal. This may further increases suction within the disclosed armature-based suction device.

The third feature is a specially designed deformation hook that offers superior augmentation and maintenance of suction by further compressing and holding the armature against the native surface when lateral loads are applied. The deformation hook exerts gravitational and/or tensionally induced leverage upon the armature in vertical, incline and horizontal shear applications. Loading of the hook perpendicular or at acute angles to the center post asymmetrically deforms and squeezes the armature body and its concentric friction ribs against the native surface, in the process creating additional suction within the armature cavity (vacuum chamber) and further mitigating slippage or migration. The asymmetrical deformation produced by the hook volumetrically increases the vacuum chamber thereby increasing suction. The more weight that is added the stronger the vacuum. This greater vacuum also helps to resists slippage of the disclosed armature-based suction device by increasing the compressive force upon the load-sided ribs and in fact most of the interior surface.

Figure 1:
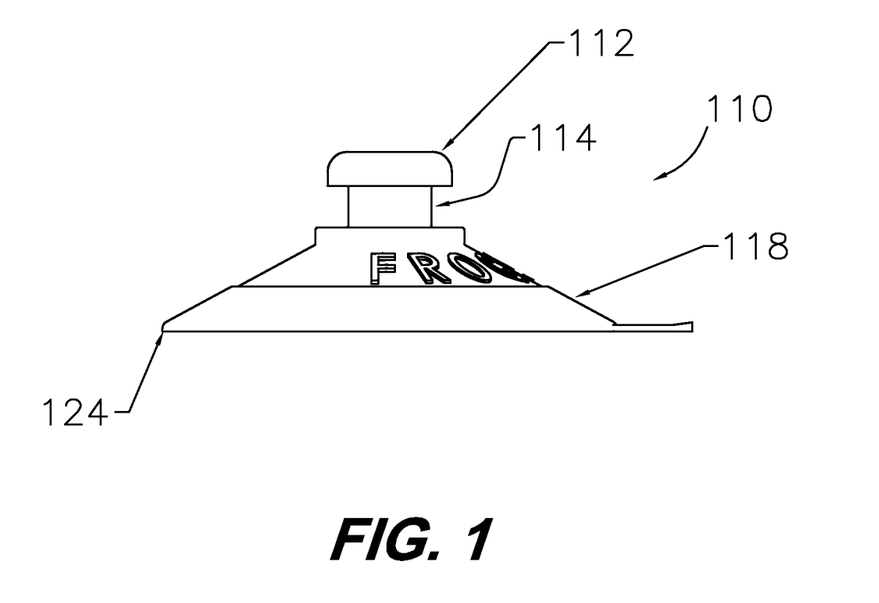
FIG. 1 is side view of the disclosed armature-based suction device.
Figure 2:
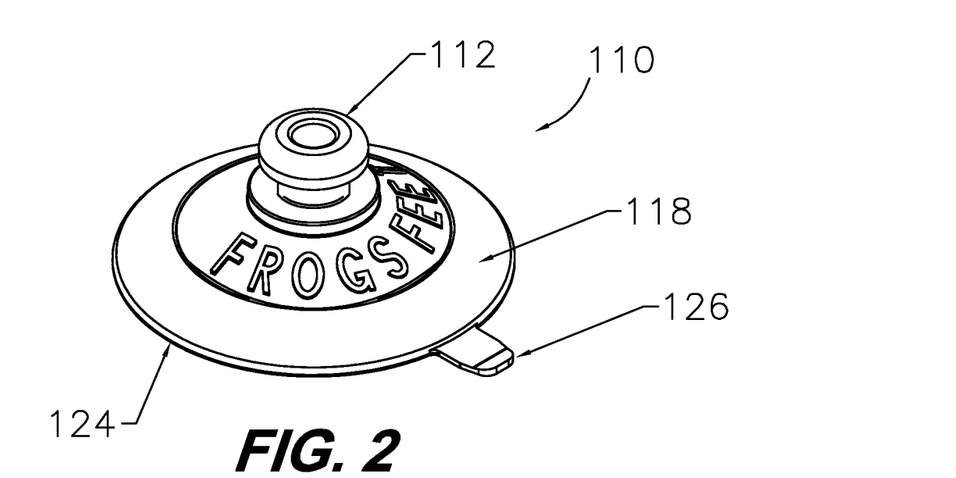
FIG. 2 is a perspective view of the disclosed armature-based suction device.
Figure 3:
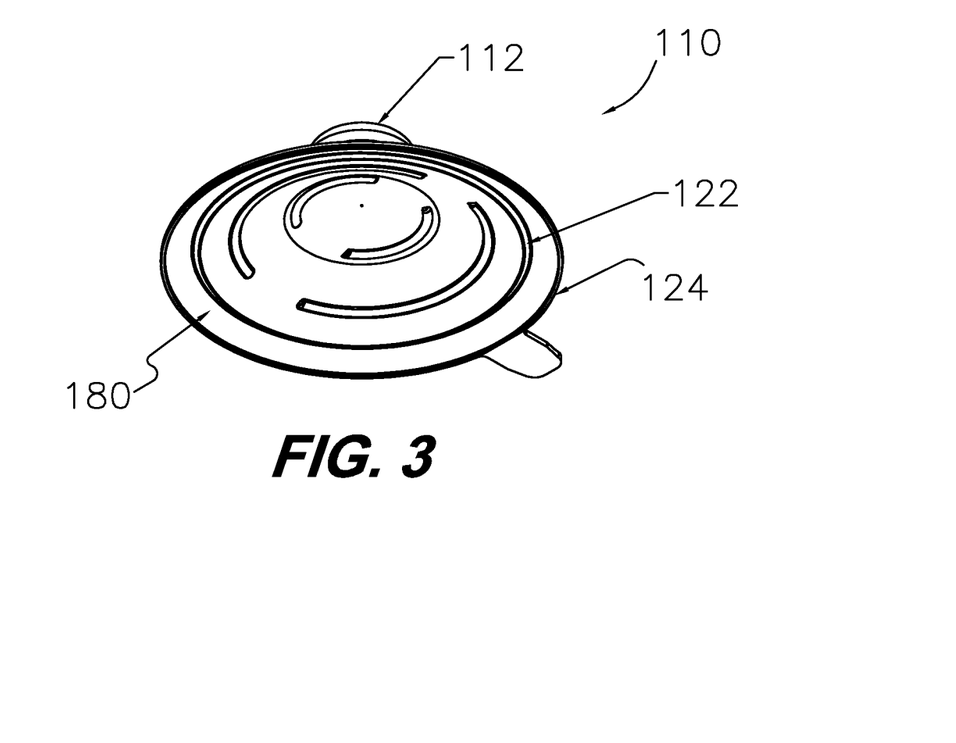
FIG. 3 is a bottom perspective view of the disclosed armature-based suction device.

FIG. 1 is a side view of a disclosed armature-based suction device 110. This armature-based suction device 110 has a post 114 and a convex surface 118. On the opposite side of the convex surface 118 is the concave surface 122 (not visible in this view) of the armature-based suction device 110. FIG. 2 shows a perspective view of the disclosed armature-based suction device 110. Tab 126 is shown. FIG. 3 is a bottom perspective view of the armature-based suction device 110. The mushroom head 112 is shown along with perimeter 124 and inside concave surface 122. Also shown is recess 180 which is used to accept seal 130 not shown. Recess 180 prevents the armature-based suction device from functioning as a stand-alone mounting device. Although an armature-based suction device with mushroom heads is shown in the figures, one of ordinary skill in the art will recognize that other styles will be suitable for this invention, including, but not limited to an armature-based suction device with Side Pilot Hole Heads, Clamps, Studs & Nuts, and an armature-based suction device with loops.

Figure 4:
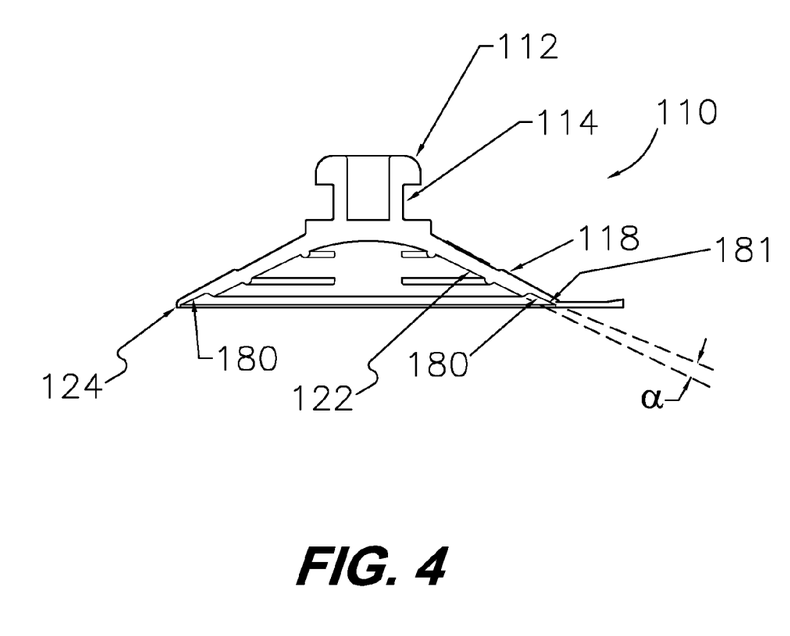
FIG. 4 is a cross-sectional view of the disclosed armature-based suction device.

FIG. 4 shows a cross-sectional of the armature-based suction device 110. Mushroom head 112, post 114 and convex surface 118 are shown. Inside concave surface 122, perimeter 124 and square-shouldered recess 180 are also shown. In this view it can be seen that the main flat surface 181 of the recess 180 is shown having an acute angle α with the inside concave surface 122, and is not parallel to the inside concave surface 122.

Figure 5:
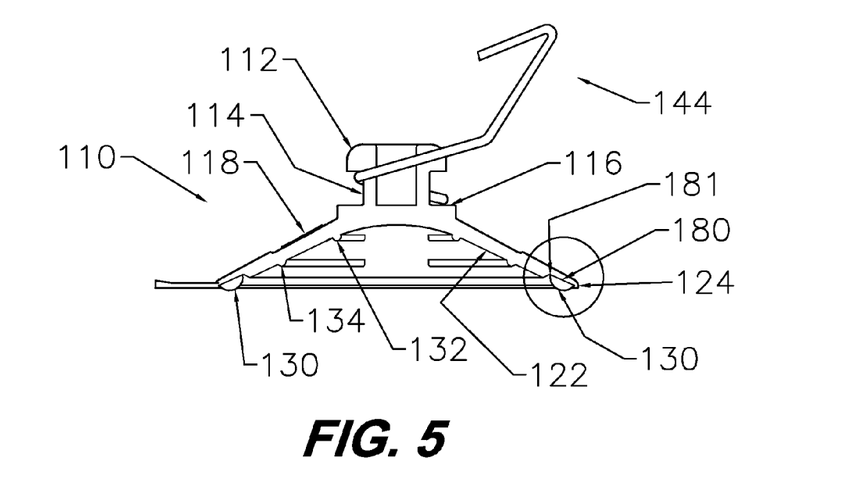
FIG. 5 is side cross-sectional view of the armature-based suction device.
Figure 5A:
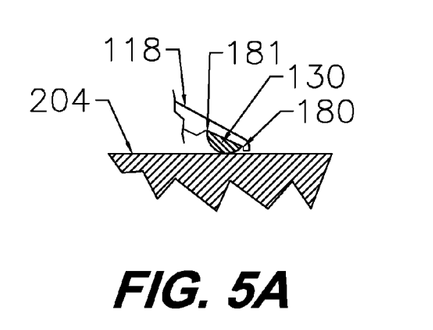
FIG. 5A is a detailed view of the annular seal before mounting to a native surface.
Figure 5B:
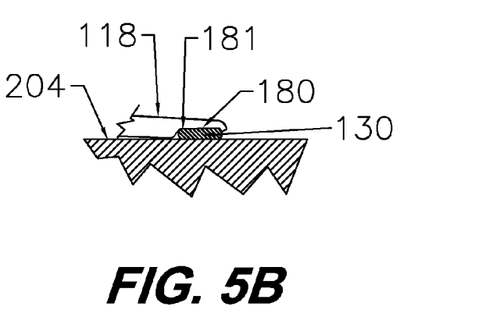
FIG. 5B is a detailed view of the annular seal after mounting to a native surface.

FIG. 5 shows a side cross-sectional of the armature-based suction device 110 with the annular seal 130 located in a recess 180 near the perimeter 124. The cross-sectional shape of the annular seal of material may be a semicircle, but may be of any suitable shape so long as it extends from the concave surface. This view also shows concentric inner ribs 132 and outer concentric ribs 134. The cross sectional shape of the ribs may be a semicircle, but may be of any suitable shape. A hook 144 is shown in communication with the post 114. In one embodiment, the hook 144 may be crimped onto the post 114. In one embodiment, the proximal portion 184 of the hook 144 is a spiral that is configured to wrap around the mushroom head 112 of the post 114, encircles the post 114, and bottoms out on the flat shelf 116 of the armature. The distal portion 188 of the hook is where items may be hung from the hook 144 and armature 110. The concave surface 122 and convex surface 118 of the armature-based suction device 110 is shown. Also shown is FIGS. 5A and 5B which are detailed views of the annular seal 130 before and after mounting to a native surface. FIG. 5B shows how the annular seal 130 material flattens, widens, and conforms to the native surface 204.

Figure 6:
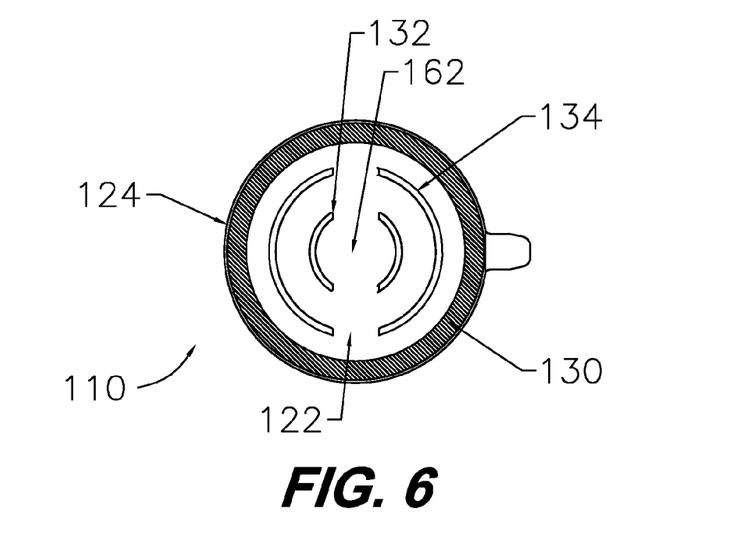
FIG. 6 is a bottom perspective view of the armature-based suction device from FIG. 5.

FIG. 6 shows a bottom perspective view the armature-based suction device 110. In this view, the seal material 130 is shown located just inside the perimeter 124 of the concave surface 122. The seal material 130 may be made out of a urethane, silicone, hot melt, closed cell foam, or some other material that is soft, resilient, and sticky. The seal material on the disclosed armature-based suction device 110 may have a durometer range of about 35 Shore 000 to about 50 Shore A. The seal 130 should produce at least 0.1 lb/in. 90° peel strength to the mounting surface. The thickness of the seal material 130 may be about 0.005 in. to about 0.5 in., and preferably about 0.010 in. to about 0.25 in. The concentric ribs 132 and 134 have a height of about 0.001 in. to 0.050 in., and preferably about 0.025 in. to about 0.035 in. The ribs 132, 134 may have a width of about 0.010 in. to about 0.100 in., and preferably about 0.030 in. to about 0.060 in. The durometer of the concentric ribs 132 and 134 may be the same as the disclosed armature-based suction device 110 which is about 60 to 80 shore A. The rib's durometer, however, could be softer or harder than the armature-based suction device 110. The ribs 132, 134 may have a semicircular cross section, but can be of different shapes. The concentric ribs 132 may be on either side of the center 162 and concentric ribs 134 may be near the seal material 130. In other embodiments, the ribs 132, 134 may be located elsewhere on the armature-based suction device 110. The number of concentric ribs 132, 134 shown in FIG. 17 is four, but may be more or less in other embodiments.

Figure 7:
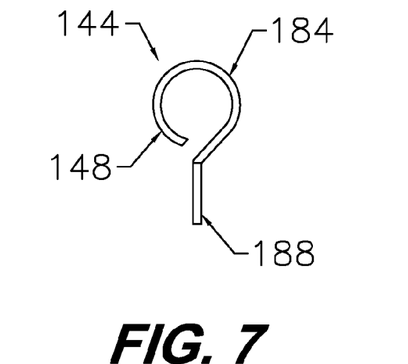
FIG. 7 is a top view of a hook.
Figure 8:
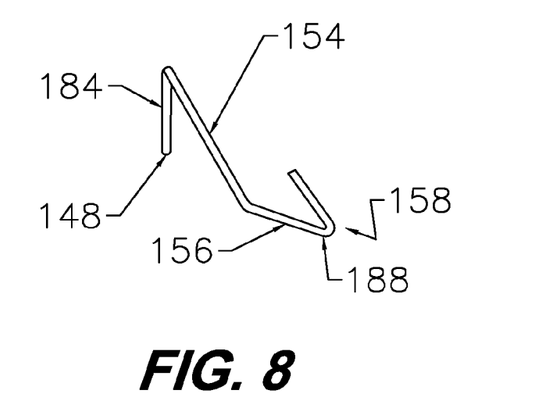
FIG. 8 is a side view of the hook from FIG. 7.

FIG. 7 shows a top view of the hook 144 and FIG. 8 shows a side view of the hook 144. The wire thickness of the disclosed hook 144 may be about 0.060 in. to about 0.120 in. The length of the hook 144 may be about 0.750 in. to about 3.00 in. The hook 144 may be made from galvanized steel, stainless steel, molded plastic, plastic, or any other suitable material. The thickness and length of the hook 144 can vary as long as the basic shape shown in FIGS. 7 and 8 is generally retained. The spiral portion 148 is in the final crimped position. The top portion 154 is at about a 10° to about 35° angle to the spiral 148 portion and the bottom portion 156 is at about 35° to about 55° angle to the spiral 148 portion. The curved bottom 158 is for hanging items vertically or securing down things on a horizontal surface. The curved bottom 158 may also been known as a "bend" for hanging items.

Figure 9:
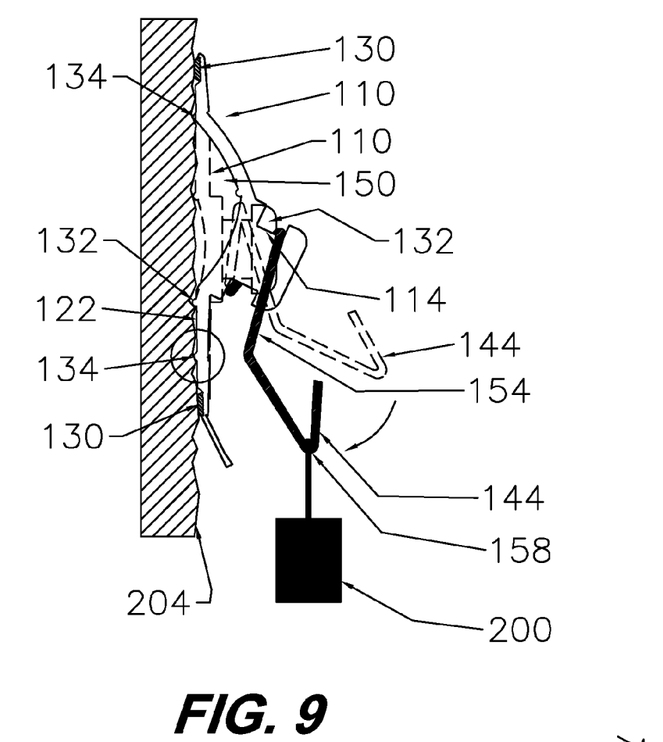
FIG. 9 shows the armature-based suction device mounted on a surface.
Figure 10:
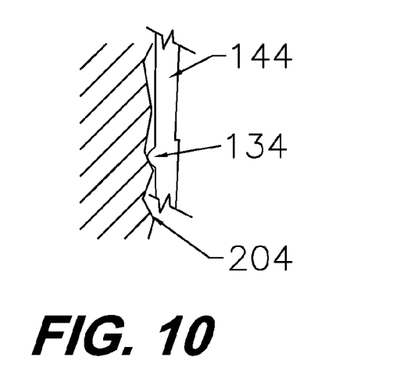
FIG. 10 is a close-up view of the armature-based suction device from FIG. 9.

FIG. 9 shows a side cross section view of the mounted armature-based suction device 110 and the way it self adjusts with a load 200 attached to the hook 144. The armature-based suction device is mounted onto a vertical and textured surface 204. The seal 130 is shown conforming and bonding to the textured surface creating an air tight barrier. The concentric ribs 132 and 134 are shown engaging with the textured surface's peaks and valleys increasing the armature's resistance to vertical sliding. Also shown is the mounted armature-based suction device 110 in dashed lines prior to the load 200 being attached to the hook 144. The hook 144 is also shown in its preloaded position in the dashed line. As one can see when a load is added the hook 144 pivots inwards towards the mounting surface 204 and subsequently pulls out on the center post 114 causing the volume of the vacuum chamber 150 to expand and as a result the vacuum strength increases. This increase in vacuum strength helps to further compress the inside armature surface 122 especially at the ribs 132, 134 where the compressive force is highly concentrated thus increasing friction at the ribs 132, 134 and holding power. The pivoting hook and concentric ribs working in conjunction act like an emergency brake for the armature-based suction device. Some suction devices when loaded may have a slight vacuum chamber volume increase, but this is caused by the weight of the load alone with no contribution from the hook. Also the compressive force is greater than in suction cup devices just below mushroom head where the armature-based suction device 110 bend is accentuated by the load and the hook 144. The armature 144 adapts and uses the weight of the load to increase the holding strength as needed depending on if it is holding a light or heavy load. This is especially important when one is mounting vertically to highly textured mounting surfaces where there is a decrease contact surface area and as a result less frictional forces to assist in holding the armature. The angled top portion 154 of the hook is at an angle of about 10° to about 35° with respect to surface 204 in the preloaded position. The angled top portion 154 rotates in toward the surface 204 when weight is added to the curved bottom portion 158 of the hook 144. The angled top portion 154 of the hook can rotate inward about 15° to about 65° depending on the load added. FIG. 10 shows detailed view of the outer concentric rib 134 engaging with the mounting surface 204. In one embodiment, the inner concentric ribs 132 are each about the same distance from the center 162 of the armature-based suction device 110, and the ribs 132 each are an arc of a circle that when added together make up less than 360° of a circle. In one embodiment, each rib 132 may be an arc of a circle that is about 90°. In one embodiment, the outer concentric ribs 134 are each about the same distance from the center 162 of the armature-based suction device 110, and the ribs 134 each are an arc of a circle that when added together make up less than 360° of a circle. In one embodiment, each rib 134 may be an arc of a circle that is about 120°.

Figure 11:
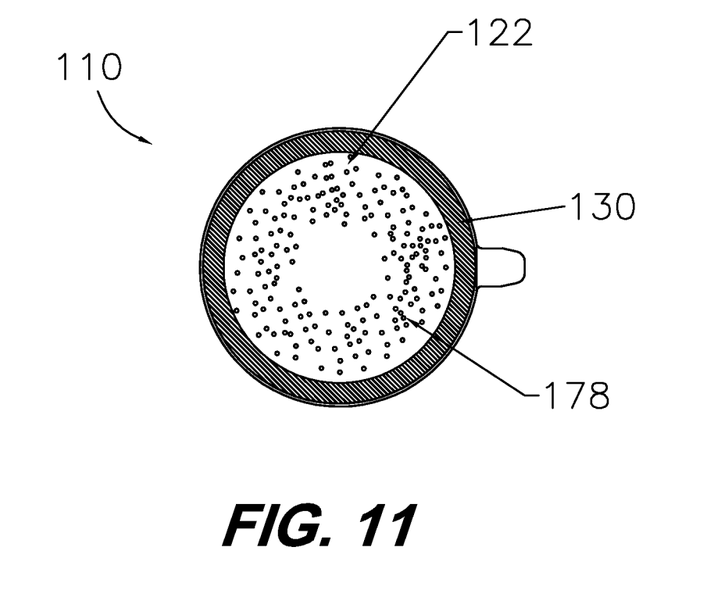
FIG. 11 is a bottom view of the armature-based suction device with grippy nodules.

FIG. 11 shows the bottom view of another embodiment of the armature-based suction device 110 where there is an annular seal 130 with the addition of a plurality of grippy non-slip individual nodules 178 or a grippy non-slip coating or film on the concave inside surface. The concave surface 122 is also shown. The grippy non-slip nodules 178 inhibit the sliding of the armature-based suction device 110 when a force is applied to the post parallel to the mounting surface. The nodules 178, film, or coating may be made out of the following non-limiting materials: rubber, urethane, silicone, PVC or similar soft, grippy, non-slip material.

The seal 130 may be created by dispensing a liquid adhesive or sealant into the recess 180 of an armature-based suction device 110, and then curing that material in place. The seal 130 may be a radiation cured material or a hot melt or some other material that is very resilient and sticky. Another method of creating seal 130 is to have it co-molded to the armature-based suction device during the injection molding process. A slight interference fit for the seal 130 can be added to the recess 180. The seal may be made out of a urethane, silicone, hot melt, TPE or some other suitable material that is very soft, resilient and sticky. In a preferred embodiment, the seal 130 will be a solid, non-flowable material. This solid, non-flowable material will allow the disclosed armature-based suction device 110 to be used and reused many times. Such a solid, non-flowable material will generally not lose its adhesive properties, nor will it generally be depleted upon use and reuse. The armature-based suction device may be made out of PVC, urethane, TPE or other suitable material. The disclosed armature-based suction device 110 may be used as follows, however one of ordinary skill will recognize that the armature-based suction device may be used in a variety of suitable ways: 1.) Press the armature-based suction device flat against the mounting surface displacing the air that was under concave surface 122. 2.) Release any entrapped air by pulling up on tab 3.) While still holding the armature in place, take a finger and firmly press and slide it around the entire seal circumference. This forces the band of sealing material to conform to the surface features and the tack bonds it to the surface to form an airtight seal. 4.) To remove and reuse the armature slowly peel it from the mounting surface releasing the vacuum. Due its inherent tacky property seal 130 may be reused and mounted on another surface. The seal 130 material may be selected from the group consisting of a UV curable polymer; a light curable polymer; a heat curable polymer; and a radiation curable polymer, and injection molded TPE that upon curing and/or processing, the material is a solid non-flowable adhesive material. Unlike other suction mounting devices that rely upon a hard shell, soft cup or disc, gasket, lever-and-spring or screw knob, the disclosed invention incorporates a unique armature of an original and proprietary design upon which an annular seal is applied to create and sustain sufficient vacuum within the device to make intimate and superior contact with surfaces of varying texture. The annular seal is very resilient, low durometer, and sticky. When pressed against a mounting surface the compliancy of the band of material conforms to the textured surface features and the sticky exterior of the material bonds it to these features creating an air impervious barrier. This seal created by the seal prevents air from leaking into the vacuum chamber so the armature is held in place by atmospheric pressure and the suction of the vacuum. The function of the disclosed armature-based suction device's peripheral channel/recess is to accommodate the semi-circular-shaped (in cross-section) annular seal and transform it into a wide, flattened, washer-shaped footprint that produces an airtight seal by conforming to the native surface. Once the disclosed armature-based suction device is mounted the square-shouldered channel/recess fixes the annular seal within it, preventing the vertical load (or horizontal tension) from resting upon the seal alone, the load instead being shared by both the seal and the interior surface of the armature. As stated previously, the square-shouldered channel/recess acts as a buttress to contain and prevent the seal from rolling under lateral loads. In addition, the disclosed armature-based suction device may be reused many times since the seal is a non-flowable solid composed of a cured polymer and thus will not readily lose it adhesive qualities. There is no need to wait for the sealing material to cure or set, and the disclosed armature-based suction device can handle its recommended weight limit as soon as it is mounted.

The disclosed armature-based suction device may be reused many times, since the seal is a non-flowable solid, and thus will generally not be depleted nor generally lose its adhesive properties. Another advantage is that the non-flowable sealing material and the armature-based suction device are ready to immediately be able to handle the recommended weight limit as soon as it is mounted. Thus, there is no need to wait for the sealing material to cure or set. Because the disclosed invention uses an already cured polymer as a sealing material, the shelf life of the non-flowable sealing material is going to be years long, instead of only weeks or months of shelf life associated with flowable sealing materials. Also, the disclosed armature-based suction device 110 is safer to use because one is not handling a flowable sealing material, which may get on human skin, causing a skin reaction, or staining clothes.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. An armature-based suction device comprising:
   a convex surface on one side of the armature-based suction device when the armature-based suction device is not in use;
   a concave surface located on an opposite side of the armature-based suction device when the armature-based suction device is not in use, the concave surface having a matte finish including microscopic channels, the concave surface comprising:
      a perimeter located on an outer edge of the concave surface wherein the perimeter is non-occlusive when the armature-based suction device is sealed onto a native surface having an uneven contour textured surface or a smooth surface;
      an annular square-shouldered recess located adjacent to the perimeter, the annular square-shouldered recess having a main flat surface that is at an acute angle to the concave surface, and the square-shouldered recess having a first wall extending from the concave surface and abutting the main flat surface, and the square-shouldered recess also having a lip extending from the concave surface and abutting the main flat surface, wherein the recess is non-occlusive when the armature-base suction device is sealed onto the native surface;

at least one annular band of soft, resilient, sticky, solid, and non-flowable material located on the annular recess, wherein the annular band has a tackiness that produces a 90° Peel strength of about 0.1 lb./in. to about 40 lbs./in, and wherein the annular band has a semi-circular cross-sectional shape, and the flat side of the semi-circular cross-sectional shape abuts the concave surface, and the circular side of the semi-circular cross-sectional shape faces away from the concave surface; and wherein the armature-based suction device cannot create a suction seal on a surface unless the annular band of soft, resilient, sticky, and non-flowable material is located on the annular square-shouldered recess, and wherein the armature-based suction device is reusable.

2. The armature-based suction device of claim 1, wherein the at least one annular band of soft, resilient, sticky, solid, and non-flowable material is selected from the group consisting of a UV curable polymer; a light curable polymer; a heat curable polymer; a hot melt polymer; a radiation curable polymer; and an injection molded TPE.

3. The armature-based suction device of claim 1, wherein the annular band has a durometer of about 35 Shore OOO to about 50 Shore A.

4. The armature of claim 1 further comprising:
a post attached generally at the center of the convex surface;
a hook attachable to the post, the hook having a spiral portion configured to generally wrap around the post, the hook also having a curved bottom portion, where the curved bottom portion is configured to allow a load to hang from the curved bottom portion when the hook is attached to the post.

5. The armature-based suction device of claim 4, wherein the curved bottom portion is an acute angle.

6. The armature-based suction device of claim 4, wherein the hook further comprises:
an angled top portion adjacent to the spiral portion;
an angled bottom portion adjacent to the angled top portion and adjacent to the curved bottom, and wherein the angle between the angled top portion and the angled bottom portion is an obtuse angle.

7. The armature-based suction device of claim 1, further comprising:
a first rib located on the concave surface of the armature-based suction device.

8. The armature-based suction device of claim 7, wherein the first rib is a concentric rib located between the annular band and the center of the concave surface.

9. The armature-based suction device of claim 8, further comprising a second rib located on the concave surface of the armature-based suction device, wherein the second rib is a concentric rib located between the annular band and the center of the concave surface, wherein the first rib and second rib are each less than about 180° of an arc of a circle, and wherein the first rib and the second rib are each about the same distance from the center of the concave surface.

10. The armature-based suction device of claim 9, further comprising a third rib and fourth rib located on the concave surface of the armature-based suction device, wherein the third rib and fourth rib each are concentric ribs located between the annular band and the first rib and second rib, wherein the third rib and fourth rib are each less than about 180° of an arc of a circle, and wherein the third rib and the fourth rib are each about the same distance from the center of the concave surface.

11. The armature-based suction device of claim 1, wherein the annular band of soft, resilient, sticky, solid, and non-flowable material is cured.

12. The armature-based suction device of claim 1, wherein the annular band of soft, resilient, sticky, solid, and non-flowable material requires no waiting time for setting.

13. The armature-based suction device of claim 1, wherein the annular band of soft, resilient, sticky, solid, and non-flowable material has a shelf life of at least two years.

14. An armature-based suction device system comprising:
a native surface having an uneven contour textured surface or a smooth surface;
an armature-based suction device removably sealed onto the native surface;
a convex surface on one side of the armature-based suction device when the armature-based suction device is not in use;
a concave surface located on an opposite side of the armature-based suction device when the armature-based suction device is not in use, the concave surface having a matte finish including microscopic channels, the concave surface comprising:
a perimeter located on an outer edge of the concave surface, wherein the perimeter is non-occlusive;
an annular square-shouldered recess located adjacent to the perimeter, the annular square-shouldered cross-sectional recess having a main flat surface that is at an acute angle to the concave surface and the square-shouldered recess having a first wall extending from the concave surface and abutting the main flat surface, and the square-shouldered recess also having a lip extending from the concave surface and abutting the main flat surface, wherein the recess is non-occlusive;
at least one annular band of soft, resilient, sticky, solid, and non-flowable material located on the annular square-shouldered cross-sectional recess, wherein the annular band has a tackiness that produces a 90° Peel strength of about 0.1 lb./in. to about 40 lbs./in, and wherein the annular band has a semi-circular cross-sectional shape, and the flat side of the semi-circular cross-sectional shape abuts the concave surface, and the circular side of the semi-circular cross-sectional shape faces away from the concave surface when not in use, and the annular band flattens, widens and conforms to the native surface features when in use;
wherein the armature-based suction device cannot create a suction seal on a surface unless the annular band of soft, resilient, sticky, solid, and non-flowable material is located on the annular square-shouldered recess, and wherein the armature-based suction device is reusable.

* * * * *